UNITED STATES PATENT OFFICE.

JOHN W. TURNER, OF JONES' MILL, ALABAMA.

ARTIFICIAL STONE.

SPECIFICATION forming part of Letters Patent No. 502,023, dated July 25, 1893.

Application filed February 4, 1893. Serial No. 460,934. (No specimens.)

*To all whom it may concern:*

Be it known that I, JOHN W. TURNER, a citizen of the United States, residing at Jones' Mill, in the county of Monroe and State of Alabama, have invented certain new and useful Improvements in Artificial Stone; and I do declare the following to be a full, clear, and exact description of the invention, such as will enable others skilled in the art to which it appertains to make and use the same.

This invention relates to certain new and useful improvements in artificial stone, and it has for its object to provide a new and improved composition which will produce a substantial and durable stone, suitable for building purposes, which will not be affected by the changes in temperature, or by the action of the elements.

To this end and to such others as the invention may pertain, the same consists in the composition hereinafter described.

In preparing my compound I combine the following ingredients, in the proportion stated, as follows: I employ to ten pounds of Portland cement, ten pounds of rock lime, ten pounds of marble dust, ten pounds of plaster of paris and ten pounds of sand. These ingredients are thoroughly mixed in a dry state, and afterward water is added in sufficient quantity to reduce the mixture to the consistency of good mortar. The compound thus prepared is placed in molds, and converted into any desired shape. Blocks of stone thus prepared may be dressed or worked as stone is ordinarily treated.

Having described my invention, what I claim to be new, and desire to secure by Letters Patent, is—

The herein described composition for building stone, the same consisting of equal parts Portland cement, rock-lime, plaster of paris, marble-dust and sand; with water, substantially as described.

In testimony whereof I affix my signature in presence of two witnesses.

JOHN W. TURNER.

Witnesses:
J. G. LUNDY,
R. BOLTON.